United States Patent [19]
Miyawaki et al.

[11] Patent Number: 5,642,237
[45] Date of Patent: Jun. 24, 1997

[54] REFLECTING MIRROR SUPPORT APPARATUS

[75] Inventors: Keizou Miyawaki; Toshinori Takatsuka; Koki Kakinuma, all of Hyogo-ken, Japan

[73] Assignee: Mitsubishi Denki Kabushiki Kaisha, Tokyo, Japan

[21] Appl. No.: 344,635

[22] Filed: Nov. 18, 1994

[30] Foreign Application Priority Data

Dec. 10, 1993 [JP] Japan .................................. 5-310449

[51] Int. Cl.⁶ .......................... G02B 7/182; G02B 26/08
[52] U.S. Cl. ...................... 359/849; 359/872; 359/874; 359/224
[58] Field of Search ........................ 359/223, 224, 359/225, 226, 846, 847, 848, 849, 872, 874

[56] References Cited

U.S. PATENT DOCUMENTS 4,500,170  2/1985  Montesanto .
4,632,523  12/1986  Knohl .
4,775,230  10/1988  Meier ................................ 359/849
5,035,497  7/1991  Itoh ................................... 359/849
5,115,351  5/1992  Miyawaki et al. .

OTHER PUBLICATIONS

"Advanced Technology Optical Telescopes IV", Proceedings, SPIE, vol. 1236, Feb. 12–16, 1990, pp. 920–928.

*Primary Examiner*—Ricky D. Shafer
*Attorney, Agent, or Firm*—Rothwell, Figg, Ernst & Kurz

[57] ABSTRACT

A reflecting mirror support apparatus is characterized in that three reflecting mirror support mechanisms (2) are respectively provided with a supporting structure part (10) fixed on the mirror cell (102), a lever (7) installed on the supporting structure part (10) rotatably around a first axis which extends parallel to the circumferential direction of the reflecting mirror (1), a rotating part (6) installed on the lever (6) rotatably around a second axis constituting an axis of the lever (6) and around third and fourth axes which intersect the second axis and a connecting part to be installed on the rotating part (4,5,6) and to be fixed on the reflecting mirror (1) and that the three reflecting mirror support mechanisms (2) are respectively fixed in such a manner that they will not be displaced in the first axis direction or the second axis direction.

16 Claims, 13 Drawing Sheets

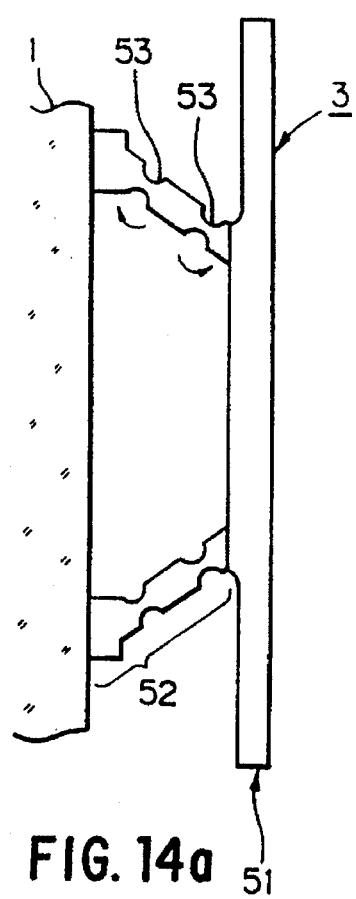
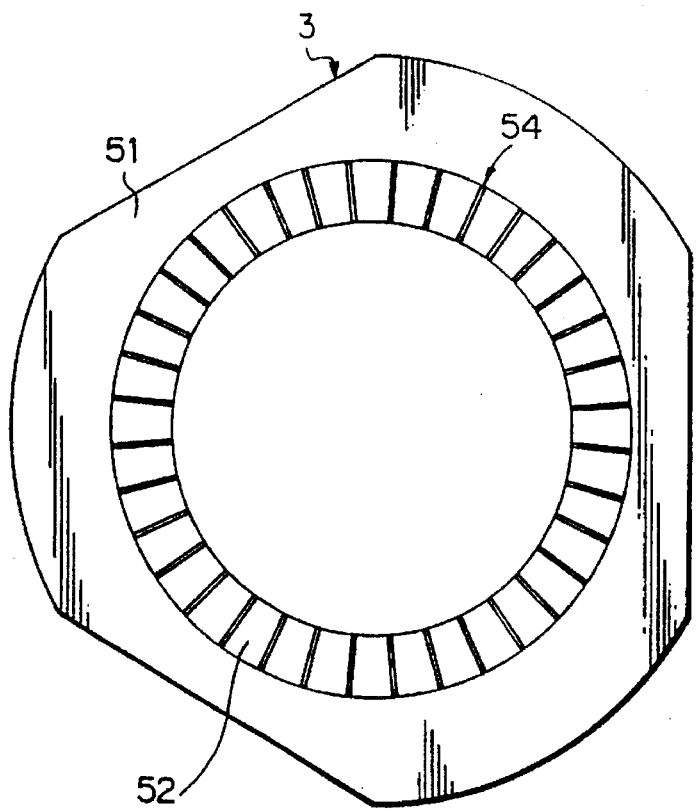
FIG. 14a
FIG. 14b
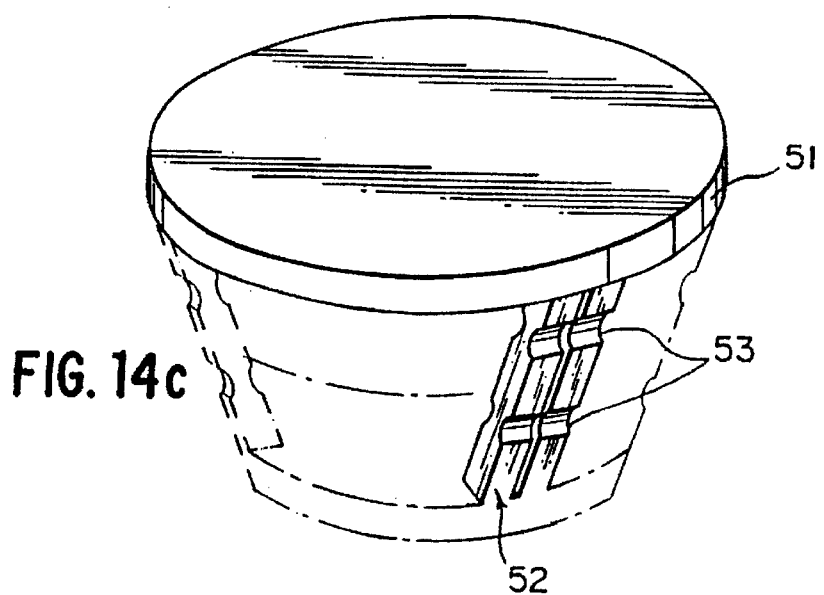
FIG. 14c

REFLECTING MIRROR SUPPORT APPARATUS

BACKGROUND OF THE INVENTION

1. Field of the Invention

The present invention relates to a reflecting mirror support apparatus for supporting a reflecting mirror used for an infrared or optical telescope.

2. Prior Art

FIGS. 15(a) and 15(b) are sectional views showing the prior art reflecting mirror support apparatus.

In the drawing, the numeral 101 denotes a thick reflecting mirror; 102 a mirror cell for supporting the thick reflecting mirror (supporting means); 103 an axial force supporting mechanism for supporting thick reflecting mirror 101 which mainly consists of counter weight 130a and link 130b and supports the thick reflecting mirror 101 without distorting the surface thereof. The numeral 104 denotes a lateral force supporting mechanism mainly consisting of counter weight 104a and link 104b, which also supports the thick reflecting mirror 101 without distorting the surface thereof. The numeral 105 denotes a reflecting mirror supporting part mainly consisting of a thin rod for supporting the thick reflecting mirror 101 at a predetermined position on the mirror cell 102. The numeral 106 denotes the center of the rotation axis (not indicated in the drawing) for changing the elevation angle of the thick reflecting mirror 101 by 0°–90°.

Next, an operation of the prior art reflecting mirror support mechanism will be explained.

When the thick reflecting mirror 101 is employed to observe stars, etc., the mirror cell 102 changes the elevation angle of the thick reflecting mirror 101 by 0°–90°. In that event, load almost as heavy as self-weight of the thick reflecting mirror 101 is applied on the mirror in the direction opposite to the self-weight in order to prevent the surface of the thick reflecting mirror 101 from being distorted due to the change in elevation angle, whereby deformation of the thick reflecting mirror is prevented. The axial force supporting mechanism 103 applies a force on the thick reflecting mirror 101 in the axial direction (axis of the mirror), whereas the lateral force supporting mechanism 104 applies a force on the thick reflecting mirror 101 in the lateral direction (direction perpendicular to the mirror axis).

The reflecting mirror supporting part 105 supports the thick reflecting mirror 101 at a predetermined position on the mirror cell 102. One end of the supporting part 105 is affixed to the bottom surface of the thick reflecting mirror 101 by adhesives, etc. with the other end being coupled to the mirror cell 102.

Since the thick reflecting mirror 101 and mirror cell 102 differ in coefficient of thermal expansion, relative displacement occurs between them as the ambient temperature changes. Furthermore, as the mirror cell 102 transforms with the change in elevation angle, relative displacement occurs between the thick reflecting mirror 101 and mirror cell 102 as the elevation angle of the mirror cell 102 changes.

However, the reflecting mirror supporting mechanism 105 consisting of a thin rod has a low rigidity except in the direction of the axis of the mirror. Therefore, the aforementioned relative displacement is absorbed by deformation of the thin rod comprising the supporting mechanism 105.

Although moment is generated on the thick reflecting mirror 101 by deformation of the reflecting mirror supporting mechanism 105, it does not cause substantial (detrimental) deformation of the thick reflecting mirror 101 because the mirror 101 has a high rigidity.

When an external force such as wind acts on the surface of the thick reflecting mirror 101, such a force is transferred to the mirror cell 102 via reflecting mirror supporting mechanism 105.

The axial force supporting mechanism 103 balances the weight of the thick reflecting mirror 101 and counter weight 103a, whereby it is possible to support the weight of axial components of the thick reflecting mirror 101 irrespective of the elevation angle of the thick reflecting mirror 101. Furthermore, even though the thick reflecting mirror 101 and mirror cell 102 expand and contract in response to differences in coefficient of thermal expansion, etc., the link 103b prevents an excessive force from being applied directly on the thick reflecting mirror 101.

Likewise, the lateral force supporting mechanism 104 balances the weight of the thick reflecting mirror 101 and counter weight 104a, whereby it is possible to support the components of weight in the radial direction of the thick reflecting mirror 101 irrespective of the elevation angle of the thick reflecting mirror 101.

Although the above explanation of the prior art concerns a mechanism for supporting a thick reflecting mirror, a support mechanism for a reflecting mirror with a large diameter and support mechanism of a thin reflecting mirror of another prior art will be explained below.

FIGS. 16(a) and 16(b) illustrate reflecting mirrors supporting mechanism disclosed in Japanese Patent Disclosure No. 1-287517, wherein FIG. 16(a) is an oblique view showing an overall structure and FIG. 16(b) is an oblique view showing a structure of a retainer. In the drawing, the numeral 111 denotes a mirror; 112 a mirror cell disposed below the mirror 111; 113 a first supporter for supporting the mirror 111 above the mirror cell 112; 114 a second supporter for supporting the mirror 111 above the mirror cell 112. Although the first supporter 113 and second supporter 114 are comprised of the same components, they differ in installation angle by 90°. The first supporter 113 and second supporter 114 consist of a tube 115, gimbal 116 rotatably connected to tube 115, shaft 117 rotatably connected to the gimbal 116, bearing 118 installed opposite to the gimbal 116 on the shaft 117 and a fixture 119 rotatably connected to the bearing 118. The first supporter 113 is installed in such a manner that the axis of the bearing 118 runs parallel with the x-axis in the drawing, whereas the second supporter 114 is installed in such a manner that the axis of the bearing 118 runs parallel with the y-axis in the drawing.

Next, an operation of the reflecting mirror supporting structure described in FIGS. 16(a) and 16(b) will be explained.

The mirror 111 is supported at three supporting points A, B and C on the mirror cell 112 by the first supporter 113 and two second supporters 114. Displacement of the mirror 111 in the x-direction and z-direction in relation to mirror cell 112 is restricted at supporting point A, whereas displacement in the y-direction and z-direction in relation to the mirror cell 112 is restricted at supporting points B and C. Thus, the mirror 111 is restricted in terms of not only displacement in the x-, y- and z-directions in relation to the mirror cell 112 but also rotation around the x-, y- and z-axes.

Therefore, as is indicated by the arrows in FIG. 16(a), when the mirror cell 112 is deformed in the x-axis direction in relation to the mirror 111, supporting point B or C moves in the x-direction, whereas the mirror 111 moves in x-direction as a rigid body. Furthermore, when the mirror cell 112 is deformed in the y-direction in relation to the mirror 111, supporting point A moves in the y-direction, whereby elastic deformation among the supporting points can be lessened.

One of the prior art thick reflecting mirrors described above has a higher rigidity than its supporting mechanism and thus is not easily deformed, while a thin reflecting mirror is easily deformed.

In the other prior art described above, the shaft 117, bearing 118 and fixture 119 are employed in order to support the mirror in the z- and x-axis directions and in the z- and y-axis directions. Since the bearing 118 is so constructed as to rotate only around the x-axis or y-axis, the gimbal 116 connected to the mirror 111 is able to move only in the y-axis or x-axis direction. Therefore, the mirror 111 is fixed at support point A in the x-axis direction, z-axis direction and around the z-axis, at support point B in the y-axis direction, z-axis direction and around the z-axis and at support point C in the y-axis direction, z-axis direction and around z-axis. In other words, there are nine support directions. Therefore, when a thin reflecting mirror with a low rigidity is employed, deformation of the reflecting mirror supporting mechanism affects the reflecting mirror.

In general, it is possible to prevent an object from moving by deterring displacement in the x-axis, y-axis and z-axis directions and rotation θx around the x-axis, rotation θy around the y-axis and rotation θz around the z-axis. In other words, displacement of an object can be prevented by deterring the above-mentioned six kinds of motion.

When there are nine support directions as in the aforementioned prior art, the results differ depending on whether an object to be supported is a rigid body or not. First, in the case where an object to be supported is a rigid body like a thick reflecting mirror, the mirror will not be deformed even though the reflecting mirror supporting mechanism is deformed. Thus, a reflecting mirror considered as a rigid body like a thick reflecting mirror is not deformed regardless of whether there are more than six support directions or less than six support directions. However, when an object to be supported is a thin reflecting mirror, the mirror is regarded as an elastic body not as a rigid body. Thus, not only the reflecting mirror supporting structure but also the mirror per se will be deformed.

As is clear from the above, in order to support a thin reflecting mirror considered as an elastic body, it is necessary to limit the number of support directions to six.

When supporting a reflecting mirror in six directions (axis directions and rotation directions around the axes), the reflecting mirror can be supported at one point in the center of the mirror in the x, y, z, θx, θy and θz directions (six directions). However, if the reflecting mirror is supported at three points on the periphery of the mirror in such a manner that they are located with as wide a space as possible between respective two points and six directions are fixed at the three points, it is possible not only to prevent deformation of a reflecting mirror but also to increase the characteristic frequency of the reflecting mirror.

The six directions may be fixed by supporting three directions, that is, the R-axis extending in the radial direction of a reflecting mirror, the θ-axis extending in the circumferential direction of the reflecting mirror and the Z-axis perpendicular to the surface of the reflecting mirror as well as another three directions, that is, θr around the R-axis, θo around the θ-axis and θz around the z-axis.

According to the prior art reflecting mirror support apparatus, when an external force such as wind, etc. acts on the mirror, a rigid body movement, rigid body rotation and local deformation arise on the reflecting mirror. The prior art does not have means for estimating the amount of such movement, rotation or deformation.

Furthermore, if a large force acts on the reflecting mirror as a result of an earthquake, etc., such a force converges on the reflecting mirror support mechanism, which could cause damage to the reflecting mirror.

Still further, it is necessary to make as small as possible the size of a junction between a reflecting mirror and the reflecting mirror support mechanism in order to inhibit the amount of thermal deformation caused by a difference in coefficient of thermal expansion between the reflecting mirror made of heat resistance glass and the reflecting mirror support mechanism, which results in a decline in rigidity of the reflecting mirror support mechanism.

The present invention has been accomplished in order to obviate the aforementioned problems.

SUMMARY OF THE INVENTION

The first object of the present invention is to provide a reflecting mirror support apparatus, in which a thin reflecting mirror per se is not deformed even though the reflecting mirror support structure supporting the thin reflecting mirror is deformed.

Another object of the present invention is to provide a reflecting mirror support apparatus, wherein the magnitude of an external force to be applied on the reflecting mirror support mechanism is detected and in the case of application of an excessive force, a part of the reflecting mirror support mechanism moves to thereby release the external force from the mechanism.

Still another object of the present invention is to provide a reflecting mirror support apparatus having a function of absorbing thermal deformation between the reflecting mirror and the reflecting mirror support mechanism.

A reflecting mirror support apparatus having three reflecting mirror support means for supporting a reflecting mirror on a mirror cell is characterized in that the reflecting mirror support means are respectively provided with a support structure part fixed to the mirror cell, a lever supported by the support structure part rotatably around the first axis parallel to the circumferential direction of the reflecting mirror, rotating parts installed on the lever which are respectively rotatable around the second axis, that is, in the axial direction of the lever and around the third and fourth axes which intersect the second axis and a junction installed on the rotating parts to which the reflecting mirror is connected and that the directions for supporting the reflecting mirror by the three reflecting mirror support means are the first axis direction and second axis direction.

As is mentioned above, a reflecting mirror support apparatus according to the present invention has three reflecting mirror support means for supporting the reflecting mirror to the mirror cell, wherein the reflecting mirror fixing means having a lever supported by a support mechanism part is rotatable around the first axis parallel to the circumferential direction of the reflecting mirror, rotating parts installed on the lever being rotatable around the second axis, that is, in the axial direction of the lever and around the third and fourth axes which intersect the second axis, the directions for supporting the reflecting mirror by the three reflecting mirror support means being the first axis direction and second axis direction. Thus, as the total number of directions for supporting a reflecting mirror is 6, the reflecting mirror only moves or rotates as a rigid body even when there is a relative displacement arising between the reflecting mirror and the mirror cell, whereby a local deformation can be prevented.

Further, a reflecting mirror support apparatus according to the present invention is characterized by comprising a parallel link mechanism disposed between a reflecting mirror support mechanism and a mirror cell and a load detector driven by the parallel link mechanism, wherein the parallel link mechanism is provided with the first lever for supporting the reflecting mirror support mechanism, the second lever which extends between one end of the first lever and the mirror cell and is rotatably connected to the first lever and mirror cell and the third lever which extends between the other end of the first lever and the mirror cell and is rotatably connected to the first lever and mirror cell so that it stays parallel to the first lever, and the load detector detects an external force acting on the reflecting mirror. Thus, an external force acting on the reflecting mirror is transferred to the load detection means through the lever and link mechanism, whereby the external force acting on the reflecting mirror is detected.

A reflecting mirror support apparatus of the present invention is characterized in that the rotation coupling parts of the parallel link mechanism are respectively comprised of a spring bearing which is provided with a pair of bottom boards disposed face to face and a pair of flexible slant boards which are located between the pair of bottom boards to connect them and are designed in such a manner that they slant in opposite directions with their phases being shifted by 90°. The aforementioned spring bearing is able to prevent a decline in detection accuracy due to the frictional force generated by the rotation parts.

Furthermore, a reflecting mirror support apparatus according to the present invention is characterized in that an overload prevention mechanism is disposed between the first axis of the reflecting mirror support mechanism and the supporting structure part and is provided with a hollow casing, the first movable needle which is contained in the first casing in such a manner that it can be vertically moved, the first spring which energizes the first movable needle in the direction of the bottom of the casing, the second movable needle supported by the first movable needle in such a manner that it can be vertically moved and the second spring which energizes the second movable needle in the direction of the upper surface of the casing and that the first axis of the reflecting mirror support mechanism is rotatably supported by the second movable needle. Thus, when a load larger than a certain value is applied on the reflecting mirror, the load is released to the support structure part to thereby prevent an overload from acting on the surface of the reflecting mirror.

Still further, a reflecting mirror support apparatus according to the present invention is characterized in that the connecting part of the reflecting mirror support device is comprised of a plate flange and a connecting board which extends in the direction of the reflecting mirror and is provided with a cone-shaped linking board connected to the reflecting mirror and that a plurality of slits extending in the direction of the flange are formed on the cone-shaped side wall of the linking board to thereby define a plurality of segments annularly arranged on the side wall, each of the segments being provided with a plurality of slits extending in parallel to the flange. When thermal deformation takes place due to a difference in linear expansion coefficient between the reflecting mirror and the reflecting mirror support device, the elastic parallel links disposed in such a manner as to form a cone transform themselves in the direction of the diameter to thereby absorb the thermal deformation.

BRIEF DESCRIPTION OF THE DRAWINGS

FIGS. 5(a) and 5(b) are sectional views of a rotating part of a reflecting mirror support apparatus according to an embodiment of the present invention, wherein FIG. 5(a) is a sectional view perpendicular to the circumferential direction of the reflecting mirror and FIG. 5(b) is a sectional view parallel to the circumferential direction of the reflecting mirror.

FIGS. 10(a)–10(c) are views showing structure and mode of use of a spring bearing employed in the present invention, wherein FIG. 10(a) is a side view of the spring bearing, FIG. 10(b) being a top view of the spring bearing, FIG. 10(c) being a sectional view of the spring bearing installed on a reflecting mirror support apparatus of the present invention.

FIGS. 11(a) and 11(b) are views for explaining an operation of a spring bearing employed for the present invention, wherein FIG. 11(a) is a graph showing a relationship between rotation angle and rotation torque and FIG. 11(b) is an illustration showing an operation of the spring bearing.

FIGS. 14(a)–14(c) are illustrations showing a structure of an elastic parallel link employed in the present invention, wherein FIG. 14(a) is a longitudinal section view of the elastic parallel link, FIG. 14(b) being a top view of the elastic parallel link, FIG. 14(c) being an oblique view of the elastic parallel link.

FIGS. 15(a) and 15(b) show the prior art reflecting mirror support apparatus, wherein FIG. 15(a) is a sectional view of an essential part thereof and FIG. 15(b) is an enlarged view of a reflecting mirror support part.

FIGS. 16(a) and 16(b) show another mode of the prior art reflecting mirror support apparatus, wherein FIG. 16(a) is an oblique view thereof and FIG. 16(b) is an oblique view of a retainer, a part of which is missing so that a structure of the retainer is shown.

DESCRIPTION OF THE PREFERRED EMBODIMENT

An embodiment of the present invention will be explained by way of FIGS. 1–8.

Figure 1:
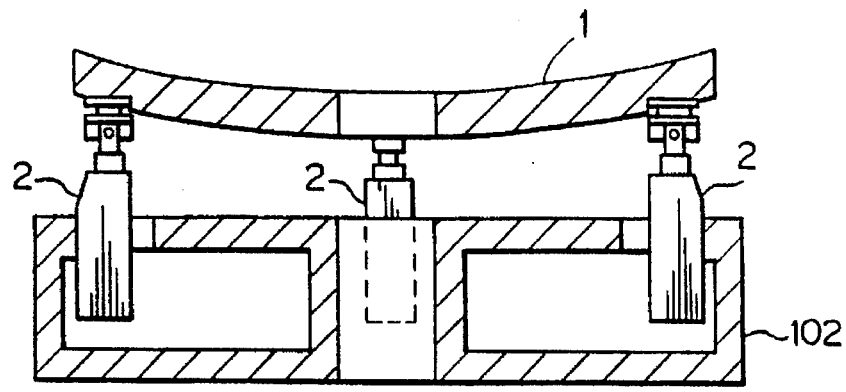
FIG. 1 is a sectional view of a reflecting mirror support apparatus according to an embodiment of the present invention.
Figure 7:
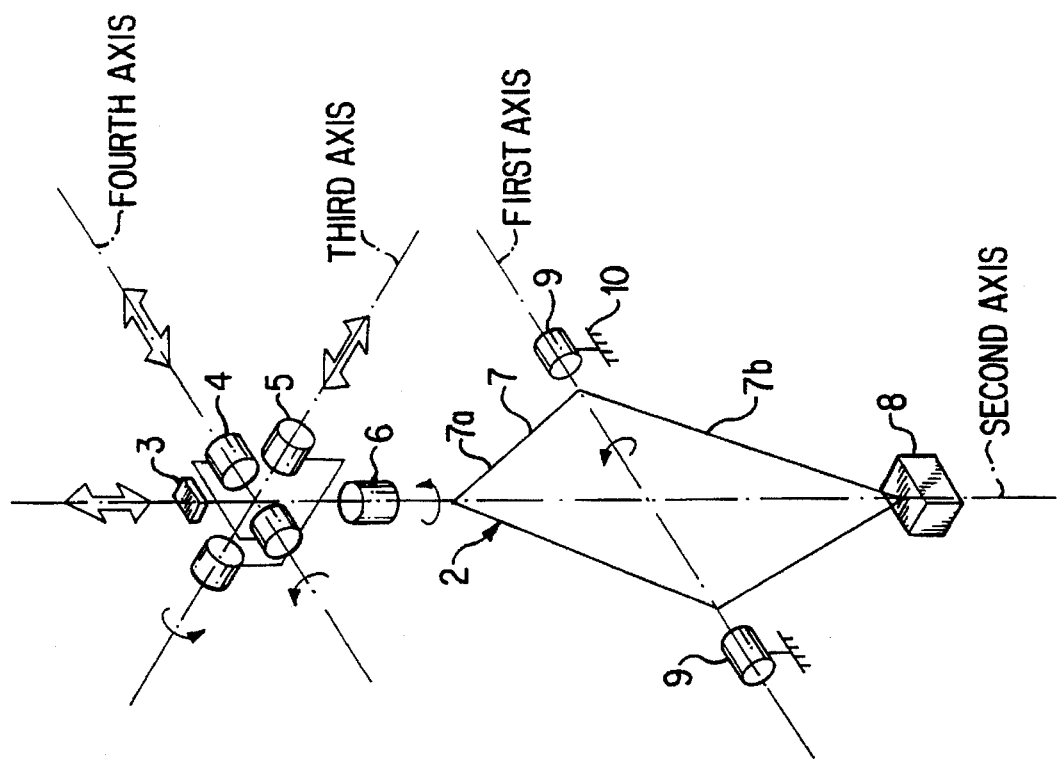
FIG. 7 is a view for explaining an operation of a reflecting mirror support apparatus according to another embodiment of the present invention.
Figure 8:
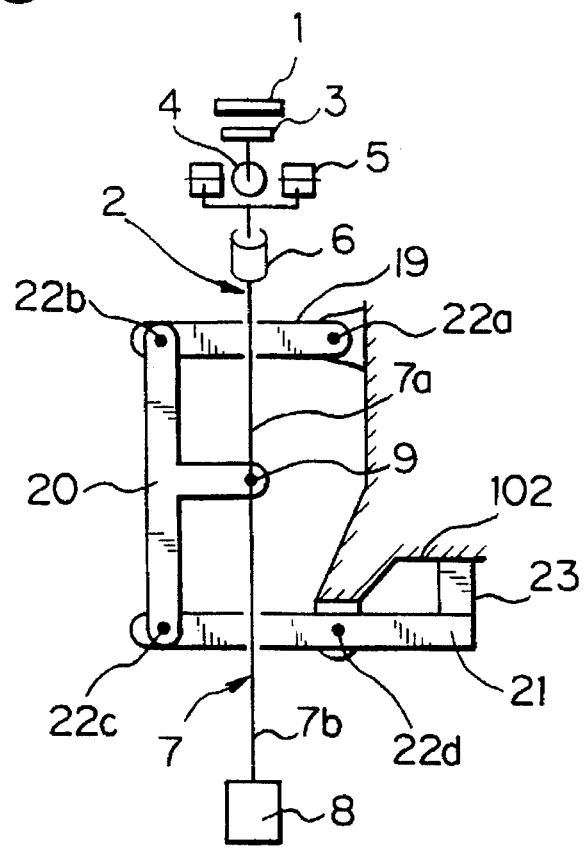
FIG. 8 is a diagram showing a structure of a reflecting mirror support apparatus according to another embodiment of the present invention.

FIG. 1 shows a constitution of a reflecting mirror and reflecting mirror support apparatus for supporting the reflecting mirror. FIGS. 1–5 show a constitution of a reflecting mirror support mechanism part for supporting the reflecting mirror. FIG. 6 shows the details of a rotating part, while FIGS. 7 and 8 illustrate an operation of the support apparatus.

Figure 2:
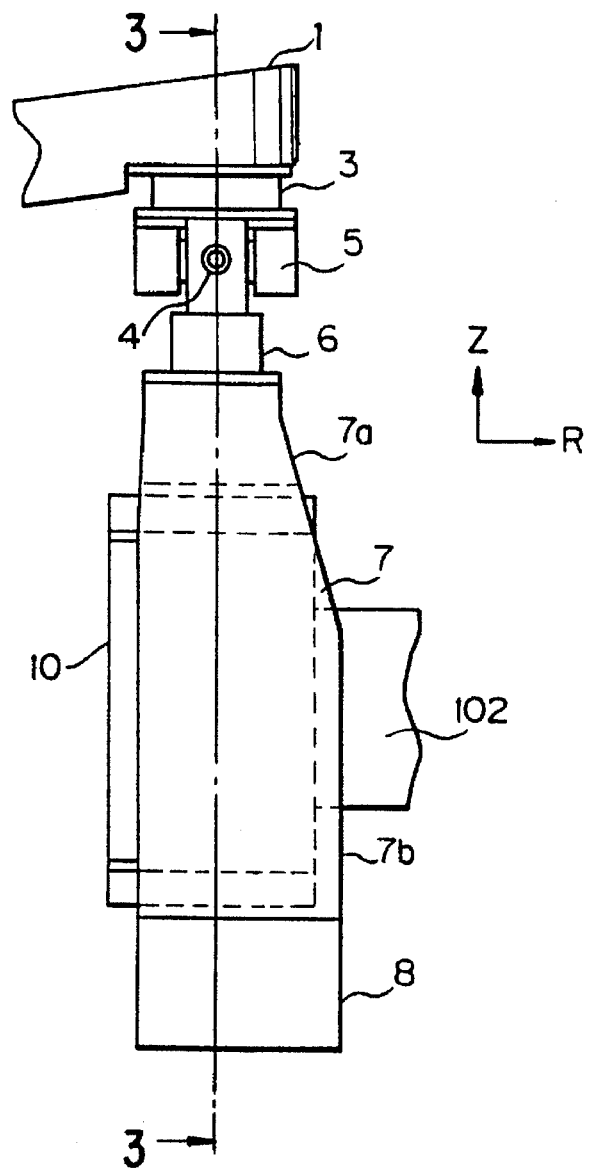
FIG. 2 is a view showing an external shape of a reflecting mirror support apparatus according to an embodiment of the present invention.
Figure 3:
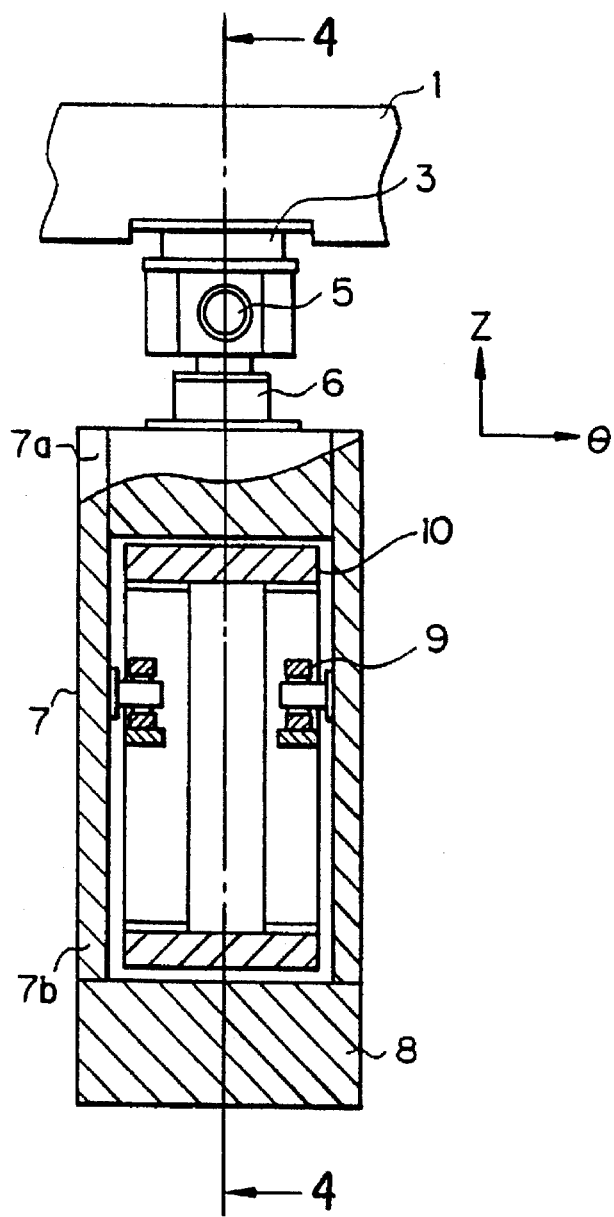
FIG. 3 is a sectional view of a reflecting mirror support apparatus according to an embodiment of the present invention.

In FIG. 1, the numeral 1 denotes a thin reflecting mirror; 2 three reflecting mirror support mechanisms for supporting the reflecting mirror; 102 a mirror cell (supporting mechanism) for supporting the reflecting mirror support mechanisms. FIG. 2 shows a structure of the reflecting mirror support mechanism. FIG. 3 is a section view of FIG. 2 cut along the line A—A, while FIG. 4 is a section view of FIG. 3 cut along the line B—B.

Figure 4:
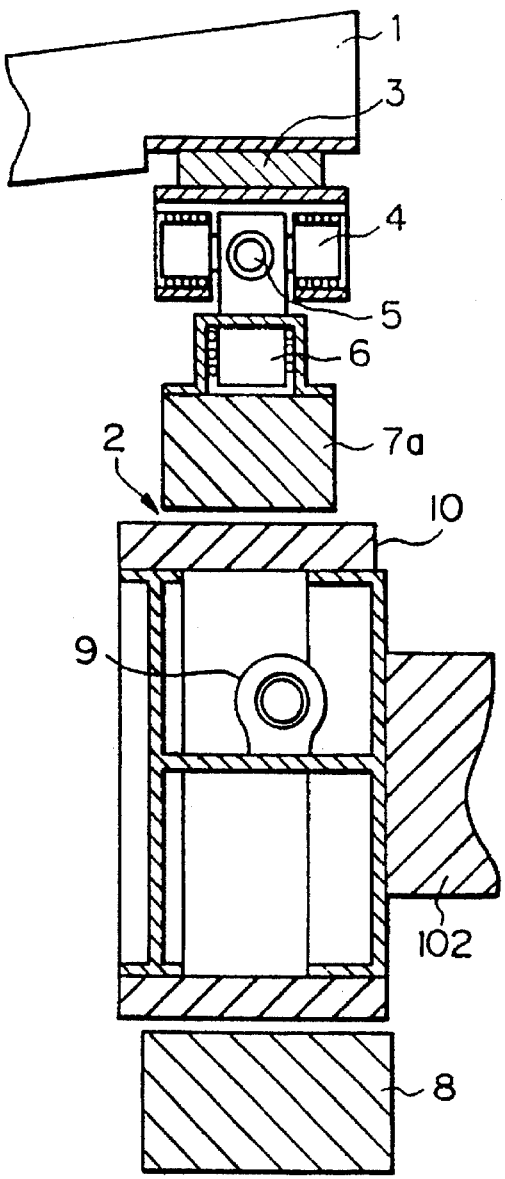
FIG. 4 is a sectional view of a reflecting mirror support apparatus according to an embodiment of the present invention.

FIGS. 2–4 show a constitution of the reflecting mirror support mechanism 2 for supporting the reflecting mirror at three points, wherein the numeral 3 denotes a junction where thin reflecting mirror 1 is connected to the support mechanism; 4 a θ rotation part rotatable around the θ axis which constitutes an axis in relation to the circumferential direction of the reflecting mirror; 5 an R rotation part rotatable around the R axis which constitutes an axis in relation to the diametrical direction; 6 a Z rotation part rotatable around the Z axis which is perpendicular to the surface of the reflecting mirror. The numeral 7a denotes an upper part of a lever for supporting the above-mentioned rotation part; 7b a lower part of a lever connected to the upper part of a lever 7a; 7 a lever consisting of the upper part of the lever 7a and lower part of the lever 7b; 8 a counter weight installed on the lower part of the lever 7b, which is balanced with a weight of each rotation part, etc. The numeral 9 is an R rotation supporting part for rotating and supporting these mechanisms around the θ axis, which is located around a junction of the thin reflecting mirror 1 and the support mechanism, whereas the numeral 10 denotes a supporting mechanism for supporting R rotation supporting part 9.

The supporting structure part 10 is fixed at the mirror cell 102.

The reflecting mirror support mechanism 2 is installed in such a manner that the direction of the rotation axis of R rotation supporting part 9 conforms with the θ axis of the reflecting mirror 1.

Figure 5B:
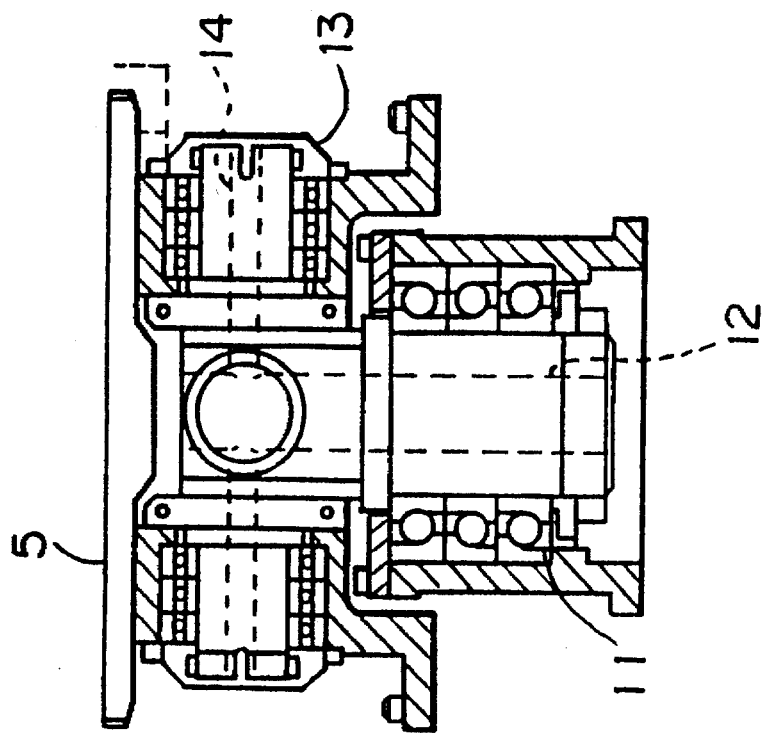
Figure 5A:
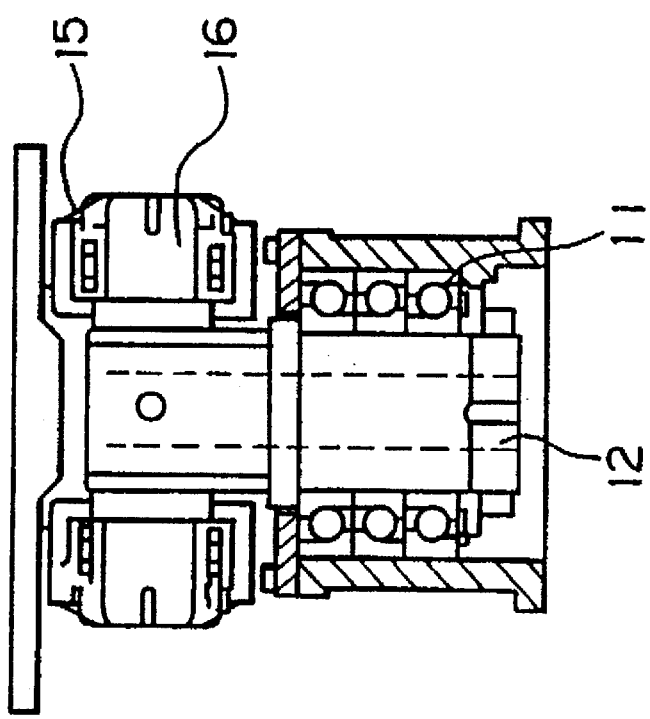
Figure 6:
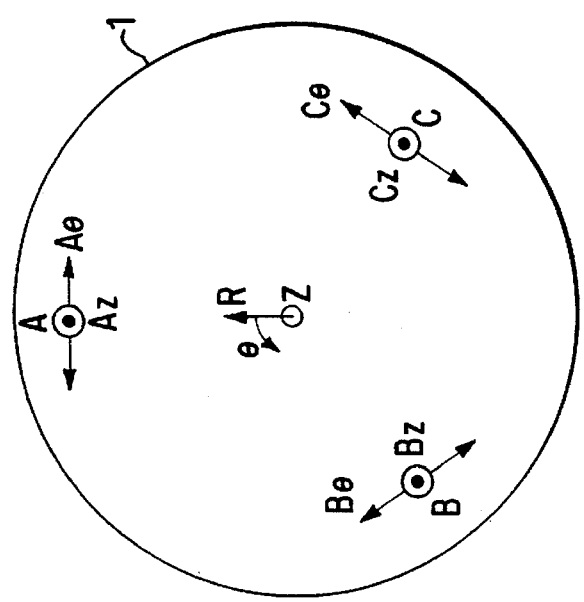
FIG. 6 is a view for explaining a point where a reflecting mirror support apparatus according to an embodiment of the present invention is fixed.

FIGS. 5(a) and 5(b) illustrate the details of θ axis rotation part 4, R rotation part 5 and Z rotation part 6. FIG. 5(a) is a section view perpendicular to the circumferential direction of the reflecting mirror, while FIG. 5(b) is a section view parallel to the circumferential direction of the reflecting mirror. In the drawings, the numeral 11 denotes a Z axis rotation bearing; 12 Z axis rotation axis; 13 a θ axis rotation bearing; 14 a θ axis rotation axis; 15 an R axis rotation bearing; 16 an R rotation axis; 3 a junction of the thin reflecting mirror and support mechanism.

Next, an operation will be explained by way of FIGS. 6 and 7.

FIG. 6 shows the reflecting mirror viewed from below, in which A, B and C denote points where the thin reflecting mirror 1 is fixed to the reflecting mirror support mechanism 2. As is indicated by the arrow in the drawing, the mirror is fixed in the ν direction (circumferential direction) and Z direction. In other words, the six directions, Aθ, AZ, Bθ, BZ, Cθ and CZ are fixed.

Next, an operation by which the aforementioned six directions constitute the support directions will be explained by way of FIG. 7.

FIG. 7 is an illustration for explaining an operation of the reflecting mirror support mechanism 2 which is fixed at the three support points A, B and C and is indicated in FIGS. 2, 3 and 4, wherein the same components are indicated by the same symbols in FIGS. 2, 3, 4 and 7. In the connecting part where the thin reflecting mirror 1 is connected to the mechanism 2, the θ rotation part 4 installed on the connecting part 3 is rotatable around the θ axis, that is, in the circumferential direction of the reflecting mirror (which is designated in FIG. 7 as a fourth axis), the R axis rotation part 5 being rotatable around the R axis in the diametrical direction of the reflecting mirror (designated in FIG. 7 as a third axis), the Z axis rotation part 6 installed below θ axis rotation part 4 and R axis rotation part 5 being rotatable around the Z axis perpendicular to the surface of the reflecting mirror (designated in FIG. 7 as a second axis).

The connecting part 3, θ axis rotating part 4, R axis rotating part 5, Z axis rotating part 6, lever 7 and counter weight 8 are rotatable around the axis of R rotation supporting part 9 (designated in FIG. 7 as a first axis).

If displacement in the Z axis and θ axis directions is restrained, the number of support directions at one support point is two and the total number of support directions at A, B and C is 6.

By restraining displacement in the Z axis and θ axis directions, rigidity in the direction perpendicular to the mirror surface and circumferential direction is enhanced.

As is clear from the above, the number of the support directions is the minimum support direction number 6. Therefore, even though relative displacement arises between the reflecting mirror and the supporting structure, either the reflecting mirror rotates as a rigid body or the supporting structure moves without causing elastic deformation. Thus, it is possible to fix the reflecting mirror without causing local deformation. When the supporting structure is deformed, only location and angle of the reflecting mirror are displaced.

In the above embodiment, when an external force such as wind acts on the reflecting mirror, the reflecting mirror moves without causing elastic deformation and rotates to be displaced only locally. Therefore, the amount of such movement, rotation and displacement can be detected by the following detection means. The detection means will be explained by way of FIG. 8.

In the drawing, the referential numbers 1, 2, 3, 4, 5, 6, 7, 8 and 9 denote the same parts as in FIGS. 1, 2, 3 and 4. However, in the embodiment indicated in FIG. 3, R rotation supporting part 9 is installed on the supporting structure part 10, whereas in the embodiment indicated in FIG. 8, R rotation supporting part 9 is rotatably connected to the first lever 20. One end of the first lever 20 is rotatably connected to the second lever 19 via pivot 22b with the other end thereof being rotatably connected to the third lever 21 via pivot 22c. The second lever 19 and the third lever 21 are arranged in parallel with each other. The other end of the second lever 19 and the intermediate point of the third lever 21 are rotatably connected to mirror cell 102 by pivots 22a and 22d respectively. The other end of the third lever 21 is connected to the mirror cell 102 via the load detector 23.

Next, an operation of the detection means indicated in FIG. 8 will be explained by way of FIG. 9.

An external force such as wind to be applied on the thin reflecting mirror 1 is transferred to R rotation supporting part 9 via upper part of a lever 7a and further to the first lever 20.

The magnitude of the external force to be applied on the third lever 21 is P. Since the third lever 21 is rotatably supported by pivot 22d to comprise a lever, a force indicated by the following formula acts on load detector 23.

PxL2/L1

Load detector 23 detects the magnitude of the force.

However, as a bearing is employed in the R rotation supporting part 9, the bearing rotates slightly due to the movement of the thin reflecting mirror, whereby friction torque M takes place. Since friction torque M is transferred by a parallel link mechanism consisting of the first lever 19, second lever 20 and third lever 21 to mirror cell 102 as force couple F perpendicular to the detection direction of load detector 23, the torque is not detected by load detector 23. Therefore, friction torque M does not affect a value detected at load detector 23.

Figure 9:
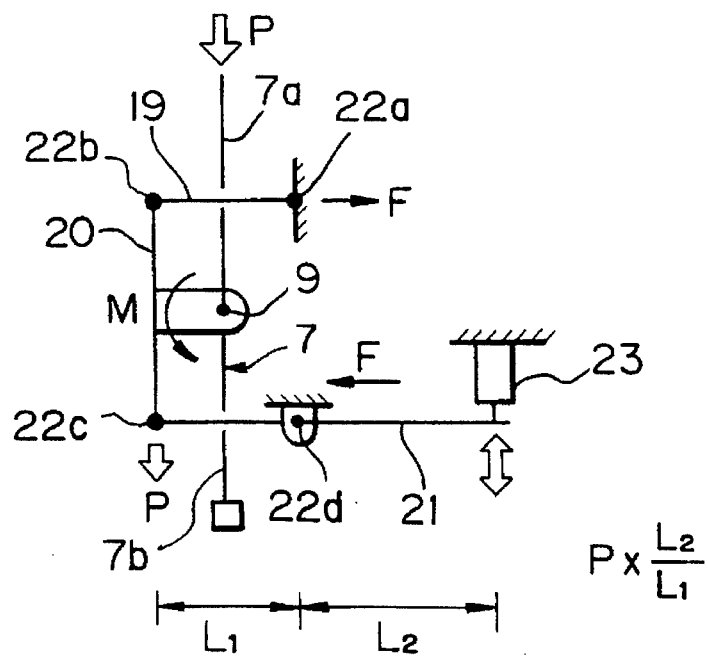
FIG. 9 is a view for explaining an operation of a reflecting mirror support apparatus according to another embodiment of the present invention.
Figure 10A:
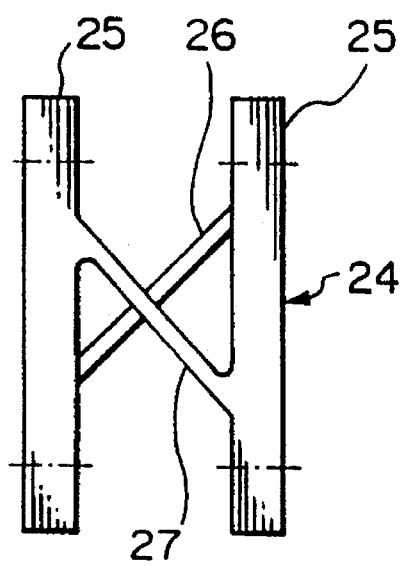
Figure 10B:
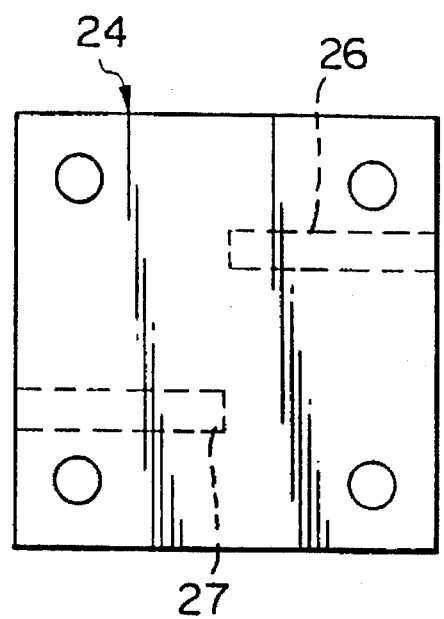
Figure 10C:
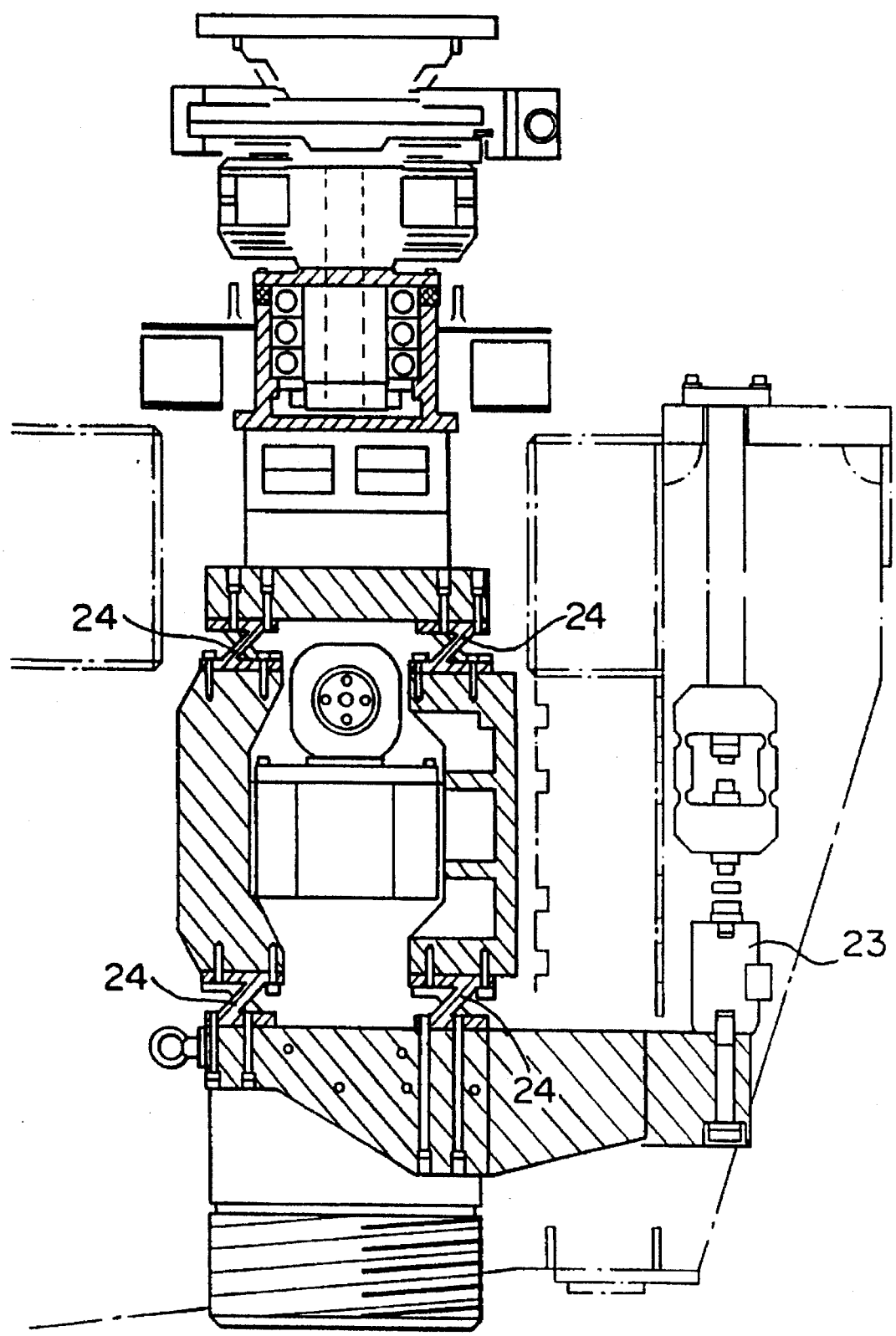

Furthermore, by employing the spring bearing 24 indicated in FIG. 10 for the rotation connecting part which rotates and connects the levers 19, 20 and 21 via the pivots 22a, 22b, 22c and 22d indicated in FIGS. 8 and 9, a force detection noise of load detector 23 can be alleviated. FIG. 10(a) is a side view of the spring bearing 24, FIG. 10(b) being a top view of the spring bearing 24, FIG. 10(c) being a section view of reflecting mirror support device wherein the spring bearing 24 is installed on the rotation connecting part of the levers 19, 20 and 21.

Figure 11A:
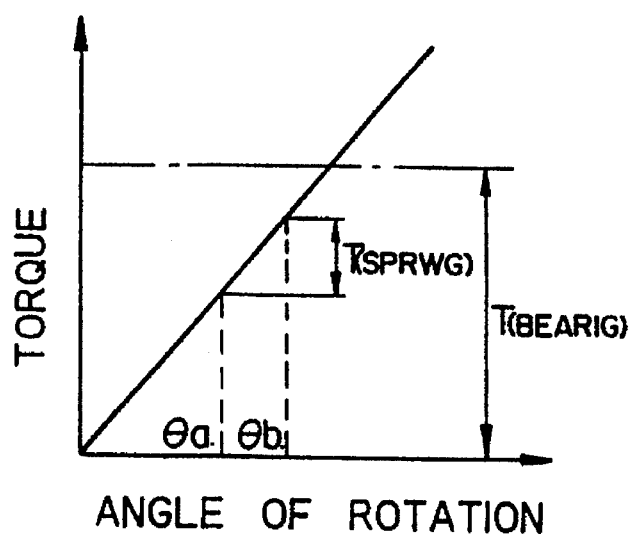
Figure 11B:
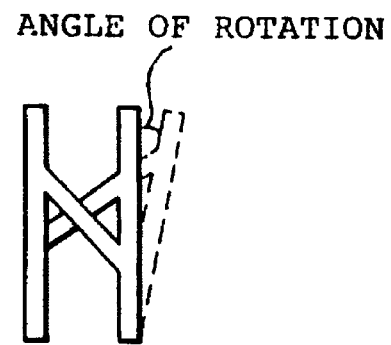

In FIGS. 10(a) and 10(b), the numeral 25 denotes a pair of bottom boards, while the numerals 26 and 27 denote thin boards disposed in an inclined manner between the pair of bottom boards 25 with a phase shifted by 90°. When a moment is applied between the pair of bottom boards 25, the thin boards 26 and 27 transform, whereby the bottom boards 25 relatively rotate. The relationship between the rotation angle and the rotation torque is indicated in FIG. 11. As the rotation angle changes from $\theta_a$ to $\theta_b$, a torque T(spring) is generated while T(spring)/L2 is generated at the load detector 23. Thus, a force detection noise of the load detector 23 can be suppressed by employing the spring bearing 24 in such a manner as is indicated in FIG. 10(c).

Next, the excessive load prevention mechanism 28 for preventing an excessive load from being applied to the reflecting mirror support mechanism 2 when a large force is applied to the reflecting mirror 1 due to an earthquake, etc. will be explained by way of FIGS. 12 and 13.

Figure 12:
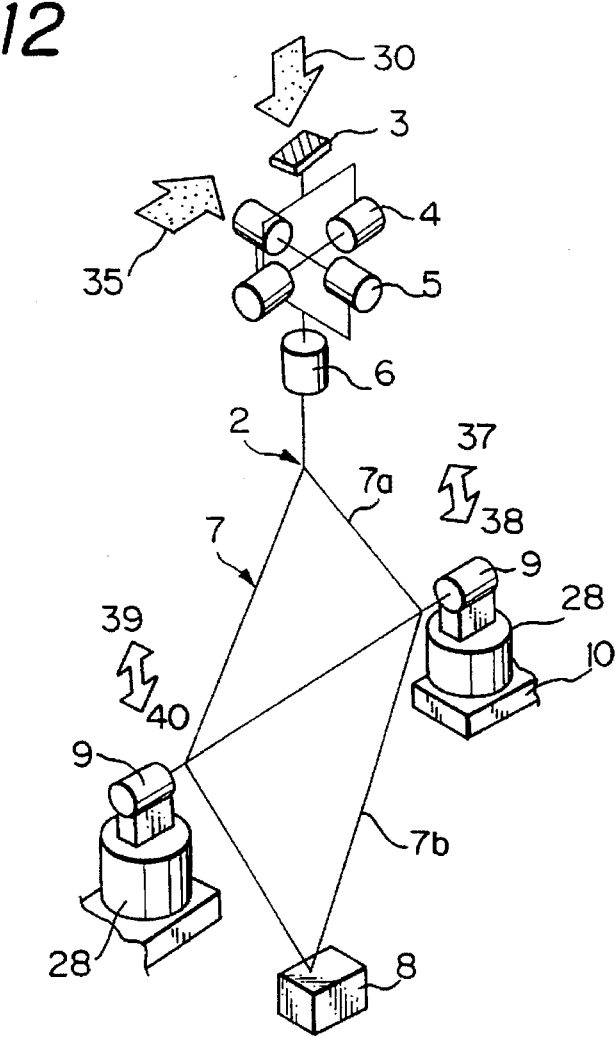
FIG. 12 is an illustration of a structure of a reflecting mirror support apparatus according to another embodiment of the present invention.

FIG. 12 shows the reflecting mirror support mechanism 2 to which the excessive load prevention mechanism 28 is added. The same symbols denote the same parts in FIGS. 7 and 12. As is indicated in the drawing, the excessive load prevention mechanism 28 is installed between the R rotation supporting mechanism 9 and the supporting mechanism 10. FIG. 13 is a sectional view showing the excessive load prevention mechanism, wherein the numeral 29 denotes a first needle; 30 a second needle; 31 an external box; 32 a first spring; 33 a second spring.

Next, an operation of the excessive load prevention mechanism 28 will be explained.

For example, when an abnormal acceleration is applied on the thin reflecting mirror 1 due to an earthquake, abnormal driving speed, etc., the force in the Z direction 36 and force in the θ direction 35 from the connecting part 3 affect on the reflecting mirror support mechanism 2. These forces are applied on the excessive load prevention mechanism 28 via the θ axis rotation part 4, R axis rotation part 5, Z axis rotation part 6, upper part of a lever 7a and R rotation supporting part 9.

The excessive load prevention mechanism 28 supports the R rotation supporting part 9 in the directions indicated by the arrows 37, 38, 39 and 40 and repeats an operation that when a force larger than a predetermined magnitude is applied on the mechanism, it moves, while it returns to the original position when the force becomes smaller than the magnitude.

In other words, when the force in the Z direction 36 is applied to the thin reflecting mirror 1 and the force becomes larger than a predetermined magnitude, the excessive load prevention mechanism 28 moves in the directions indicated by the arrows 38 and 40 to thereby release the excessively large force to the supporting mechanism 10. Thus, the thin reflecting mirror 1 is not exposed to a force larger than a predetermined magnitude.

Figure 13:
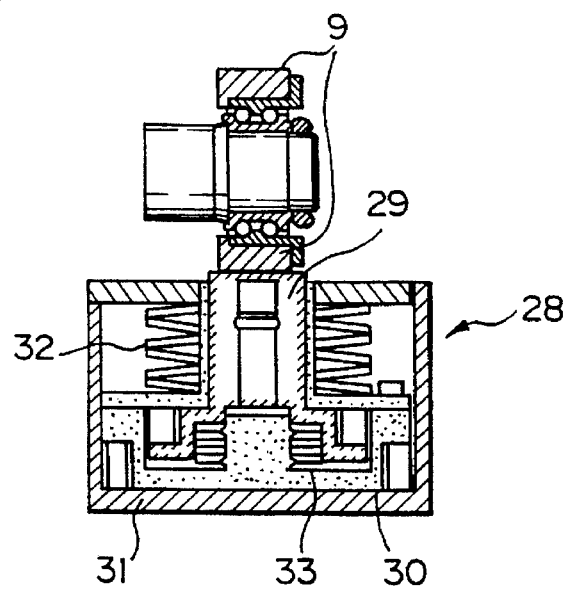
FIG. 13 is a sectional view of an excessive load prevention mechanism.
Figure 15A:
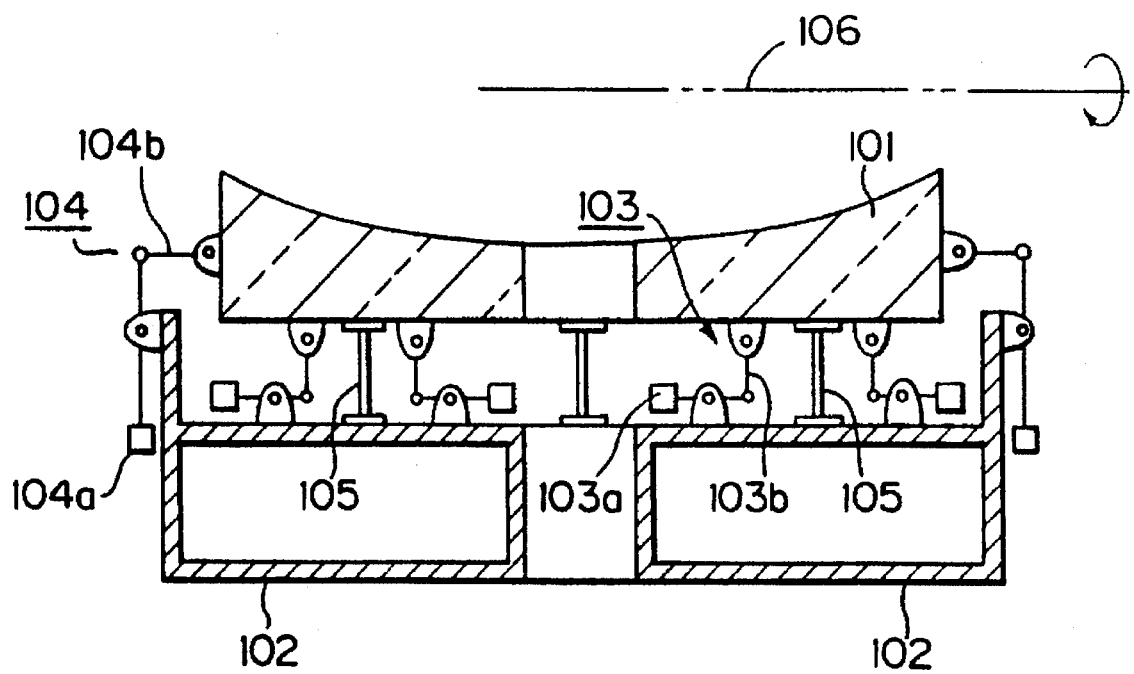
Figure 15B:
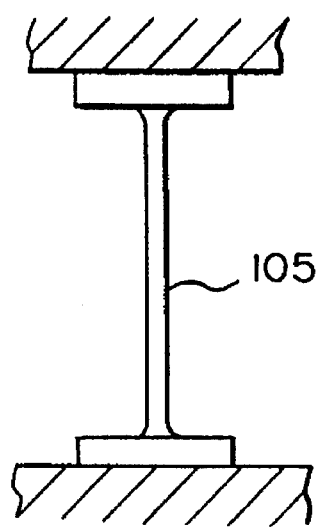
Figure 16A:
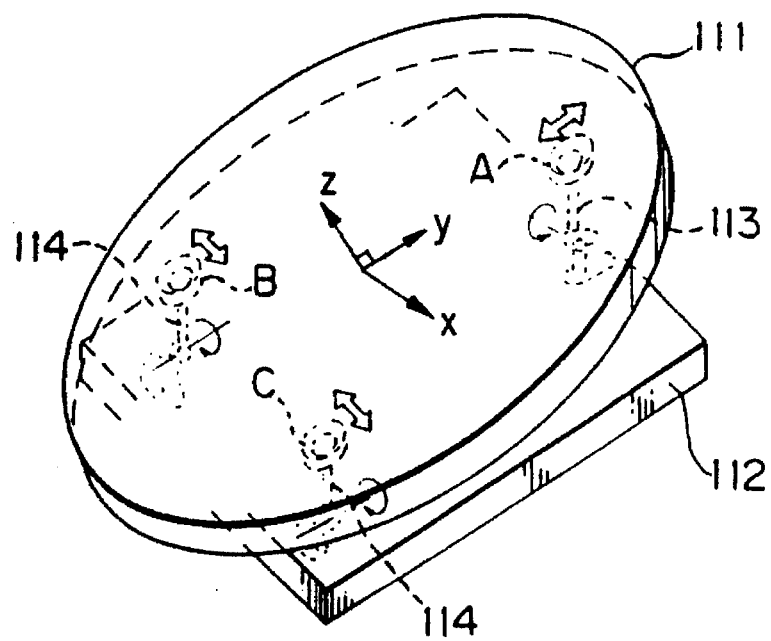
Figure 16B:
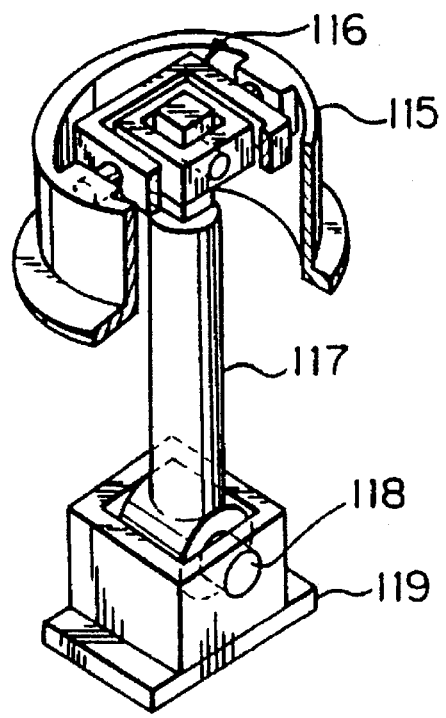
Figure 17B:
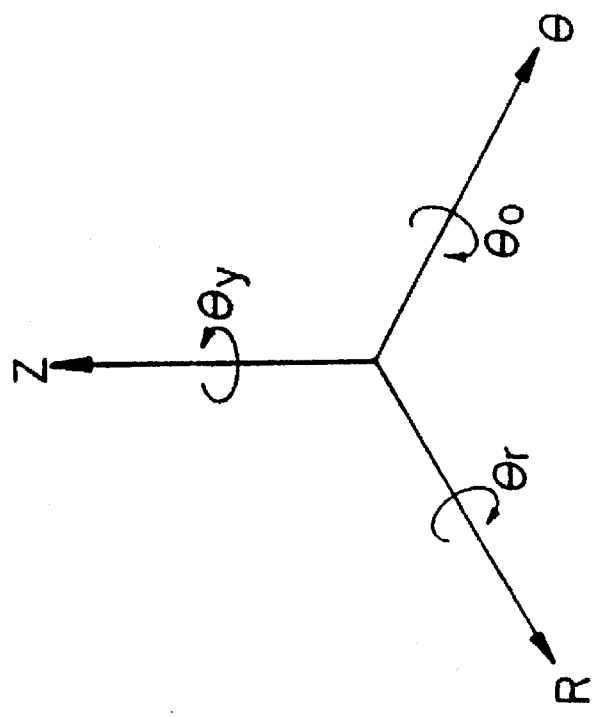
FIGS. 17(a) and 17(b) are an illustration for explaining an operation of the prior art reflecting mirror support apparatus.
Figure 17A:
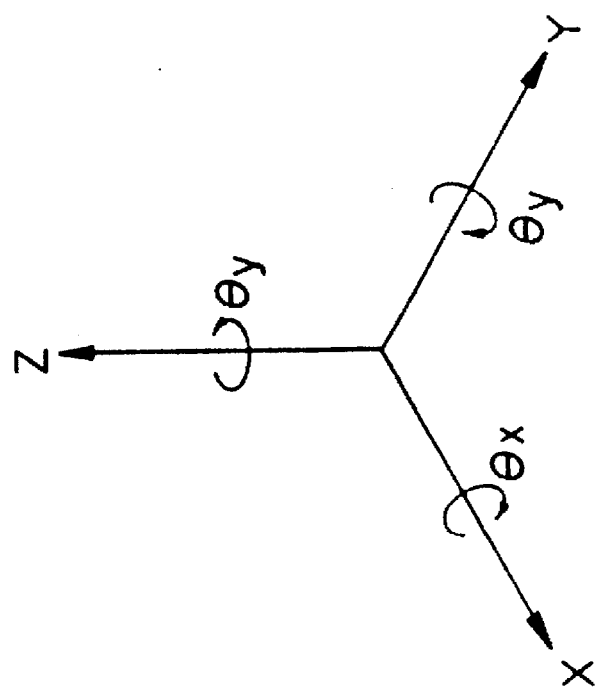

FIG. 13 is a sectional view of the excessive load prevention mechanism 28. When a force larger than a predetermined magnitude is applied from the R rotation supporting part 9 to the upper part of the paper, the first spring 32 for pressing the second needle 30 to the external box 31 transforms, whereby the second needle 30 moves upward. As is mentioned above, however, the first spring 32 does not transform unless a force larger than a predetermined magnitude is applied.

When a force larger than a predetermined magnitude is applied from the R rotation supporting part 9 to the lower part of the paper, the second spring 33 for pressing the first needle 29 to the needle 30 transforms, whereby the first element 29 moves downward. For the same reason as mentioned above, the second spring 33 does not transform unless a force larger than a predetermined magnitude is applied.

As is clear from the above explanation, when a large force is applied on the reflecting mirror 1, the pair of excessive load prevention mechanisms 28 respectively move perpendicularly to the surface of the mirror, whereby the reflecting mirror support mechanism 2 moves or rotates to release a force to the mirror cell 10. Thus, it is possible to prevent the reflecting mirror 1 from being affected by a large force applied on the mirror.

Next, an elastic parallel link disposed at the connecting part 3 in the above embodiment will be explained.

As is indicated in FIGS. 14(a), 14(b) and 14(c), the elastic parallel link is provided with a plurality of link boards 52 arranged in the form of a cone and lessens the amount of thermal deformation caused by a difference in thermal expansion coefficient between the reflecting mirror 1 and the reflecting mirror support mechanism 2. FIG. 14(a) is a sectional view of the connecting part 3, FIG. 14(b) being an illustration for showing the surface where the connecting part 3 is installed on the reflecting mirror 1, FIG. 14(c) being an oblique view of the elastic parallel link. In the drawings, the numeral 51 denotes a connecting board; 52 a link board; 53 a circular arc slit formed on the link board 52; 54 a plurality of slits arranged radially with a view to define the link board 52.

In general, the connecting part 3 is a position where the reflecting mirror support mechanism 2 is installed on the thin reflecting mirror 1 and the ends of the link board 52 are connected to the thin reflecting mirror 1. As the thin reflecting mirror 1 differs from the connecting board 51 and link board 52 in linear expansion coefficient, the thin reflecting mirror 1 could be adversely deformed with a change in atmospheric temperature.

In order to prevent this, the link board 52 is provided with two slits 53. When a relative displacement in the diametric direction takes place between the thin reflecting mirror 1 and the connecting board 51 as atmospheric temperature changes, the link board 52 rotates in the opposite directions as indicated by the arrows of the slits 53, whereby the thin reflecting mirror 1 side of the link board 52 extends and shrinks in the diametrical direction to absorb the relative displacement.

Although the above embodiment concerns the thin reflecting mirror 1, it is obvious that the present invention is applicable to other reflecting mirrors with a view to preventing deformation.

Further, although the above embodiment pertains to a case where the Z axis is perpendicular to the reflecting mirror, the Z axis, R axis and θ axis being perpendicular to one another, the Z axis does not have to be perpendicular to a reflecting mirror and the Z, R and θ axes do not have to have the relationship described above.

Given the aforementioned constitution, the present invention has the following effects.

A lever of a reflecting mirror support mechanism supported by a supporting structure part according to the present invention is rotatable around a first axis parallel to the circumference of the reflecting mirror and a rotation part installed on the lever is rotatable around a second axis in the axial direction of the lever and around third and fourth axes intersecting the second axis. The reflecting mirror is fixed by each reflecting mirror support mechanism in two directions, that is, the first axial direction and second axial direction and three reflecting mirror support mechanisms are disposed in such a manner as described in FIG. 6. Therefore, as the reflecting mirror is fixed in 6 directions, it only moves or rotates as a rigid body even though a relative displacement takes place between the reflecting mirror and the mirror cell, whereby an elastic deformation can be prevented.

Furthermore, an apparatus according to the present invention is provided with a first lever, one end of which is rotatably connected to the mirror cell via the first spindle, a second lever, one end of which is rotatably connected to the other end of the first lever via the second spindle, a third lever, one end of which is rotatably connected to the other end of the second lever via the third spindle and a load detection means for detecting an external force acting on the reflecting mirror, the load detection means being installed on the other end of the third lever in such a manner as to contact the mirror cell as a parallel link mechanism wherein the middle part of the third lever is rotatably connected to the mirror cell via the fourth spindle, the first lever and third lever being able to move in parallel to each other. As the apparatus is designed so that the external force acting on the reflecting mirror is released to the load detection means via the lever of the reflecting mirror support mechanism and link mechanism, an external force acting on the reflecting mirror can be detected.

Still further, if the rotation connecting part of the link mechanism for supporting the reflecting mirror support mechanism to the mirror cell comprises a spring bearing part, decline of accuracy in detection due to friction arising at the rotating part can be prevented, whereby an external force applied on the reflecting mirror can be detected with high precision.

Still further, if an excessive load prevention mechanism is installed on the rotation connecting part of the lever of the supporting structure part, the reflecting mirror support mechanism moves or rotates when a load larger than a predetermined magnitude is applied on the mirror surface in the direction perpendicular to the surface or in the circumferential direction, whereby the force is released to the supporting structure part and an excessive load is prevented from acting on the mirror surface.

Still further, if the connecting part for connecting the reflecting mirror to the reflecting mirror support mechanism comprises elastic parallel links arranged in the form of a cone, thermal deformation caused due to difference in linear expansion coefficient between the reflecting mirror and the reflecting mirror support mechanism can be absorbed by transformation of the reflecting mirror.

What is claimed is:

1. A reflecting mirror support apparatus including a reflecting mirror, a mirror cell for supporting said reflecting mirror and three reflecting mirror support mechanisms which are installed between said reflecting mirror and said mirror cell to fix the reflecting mirror to the mirror cell, characterized in that said three reflecting mirror support mechanisms are respectively provided with a supporting structure part fixed on said mirror cell, a lever installed on said supporting structure part rotatably around a first axis which extends parallel to the circumferential direction of the reflecting mirror, a rotating part installed on said lever rotatably around a second axis constituting an axis of said lever and around third and fourth axes which intersect the second axis and a connecting part to be installed on said rotating part and to be fixed on said reflecting mirror and that said three reflecting mirror support mechanisms are respectively fixed in such a manner that they will not be displaced in the first axis direction or the second axis direction.

2. A reflecting mirror support apparatus according to claim 1, wherein said first axis intersects said second axis.

3. A reflecting mirror support device according to claim 1, wherein said first axis and second axis cross at right angles.

4. A reflecting mirror support apparatus according to claim 1, wherein said third axis is torsional to said first axis.

5. A reflecting mirror support apparatus according to claim 4, wherein said fourth axis extends parallel to said first axis.

6. A reflecting mirror support apparatus according to claim 1, wherein said second axis extends perpendicular to the surface of said reflecting mirror, said first, third and fourth axes respectively intersecting said second axis at right angles, said third axis and fourth axis crossing at right angles on the same plane, said first axis and fourth axis extending parallel to each other.

7. A reflecting mirror support apparatus according to claim 1, wherein the device is provided with a parallel link mechanism installed between said reflecting mirror support mechanism and said mirror cell and a load detector driven by said parallel link mechanism, said parallel link mechanism being provided with a first lever for supporting said reflecting mirror support mechanism, a second lever which extends between one end of said first lever and said mirror cell and is rotatably connected to said first lever and mirror cell and a third lever which extends between the other end of said first lever and said mirror cell and is rotatably connected to said first lever and said mirror cell in such a manner that it remains parallel to said second lever.

8. A reflecting mirror support apparatus according to claim 7, wherein the center part of said third lever of said parallel link mechanism is rotatably connected to said mirror cell and said load detector is disposed between the end part of said third lever opposite to said first lever and said mirror cell.

9. A reflecting mirror support apparatus according to claim 7 or 8, wherein a rotation connecting part of said parallel link mechanism comprises a spring bearing which is provided with a pair of bottom boards disposed opposite to each other and a pair of flexible tilting boards, said pair of tilting boards being located between said pair of bottom boards to connect said pair of bottom boards and being configured in such a manner that they tilt in opposite directions with the phase being shifted by 90°.

10. A reflecting mirror support apparatus according to claim 1, wherein an excessive load prevention mechanism is installed between said first axis and said supporting structure part, said excessive load prevention mechanism being provided with a hollow casing, a first needle contained in the casing in a vertically movable manner, a first spring for energizing said first needle toward the bottom part of said casing, a second needle supported on said first needle in a vertically movable manner and a second spring for energizing said second needle toward the upper part of said casing, said first axis of said reflecting mirror support mechanism being rotatably supported by said second needle.

11. A reflecting mirror support apparatus according to claim 1, wherein said connecting part of said reflecting mirror support device consists of a plane flange to be installed on said rotating part and a connecting board which extends in the reflecting mirror direction from the flange and is provided with a cone-shaped link board connected to said reflecting mirror, a plurality of slits extending in the flange direction being formed on the cone-shaped side wall of said link board to thereby define a plurality of segments annularly arranged on said side wall, a plurality of slits extending parallel to said flange being formed on said respective segments.

12. A reflecting mirror support apparatus including a mirror cell for supporting said reflecting mirror and three reflecting mirror support mechanisms which are installed between said reflecting mirror and said mirror cell and support the mirror at the mirror cell, characterized in that said three reflecting mirror support mechanisms are respectively provided with a supporting structure part supported at said mirror cell, a lever installed on said supporting structure part rotatably around a first axis extending parallel to the circumferential direction of the reflecting mirror, a rotation part installed on said lever rotatably around a second axis comprising an axis of said lever and third and fourth axes which intersect the second axis and a connecting part installed on said rotating part and supported at said reflecting mirror, said three reflecting mirror support mechanisms being supported in such a manner that they will not displace in the first axis direction or second axis direction, said second axis extending perpendicular to the surface of the reflecting mirror, said first, third and fourth axes respectively intersecting the second axis at right angles, said third and fourth axes crossing at right angles on the same plane, said first and fourth axes extending parallel to each other.

13. A reflecting mirror support apparatus including a reflecting mirror, a mirror cell for supporting the reflecting mirror and three reflecting mirror support mechanisms, wherein said three reflecting mirror support mechanisms are respectively provided with a supporting structure part supported at said mirror cell, a lever installed on said supporting structure part rotatably around a first axis extending parallel to the circumferential direction of the reflecting mirror, a rotating part installed on said lever rotatably around a second axis comprising an axis of said lever and third and fourth axes and a connecting part installed on said rotating part and supported on said reflecting mirror, a load detector driven by a parallel link mechanism installed between said reflecting mirror support mechanism and said mirror cell and by said parallel link mechanism, said three reflecting mirror support mechanisms being supported in such a manner that they will not be displaced in the first axis direction or second axis direction, said second axis extending perpendicular to the surface of the reflecting mirror, said first, third and fourth axes intersecting the second axis at right angles, said third axis and fourth axis crossing at right angles on the same plane, said first axis and fourth axis being configured so as to extend parallel to each other, said parallel link mechanism being provided with a first lever for supporting said reflecting mirror support mechanism, a second lever which extends between one end of said first lever and said mirror cell and is rotatably connected to said first lever and said mirror cell and a third lever which extends between the other end of said first lever and the mirror cell and is rotatably connected to said first lever and said mirror cell in such a manner that they will remain parallel to the second lever.

14. A reflecting mirror support apparatus according to claim 13, wherein the center part of said third lever of said parallel link mechanism is rotatably connected to said mirror cell, said load detector being disposed between an end part of the third lever opposite to the first lever and the mirror cell.

15. A reflecting mirror support apparatus according to 13 or 14, wherein said parallel link mechanism comprises a spring bearing, said spring bearing being provided with a pair of bottom boards disposed opposite to each other and a pair of flexible tilting boards, said pair of tilting boards being located between said pair of bottom boards to connect said pair of bottom boards and being configured so that they tilt in the opposite direction with a phase being shifted by 90°.

16. A reflecting mirror support apparatus including a reflecting mirror, a mirror cell for supporting the reflecting mirror and three reflecting mirror support mechanisms installed between said reflecting mirror and said mirror cell and supporting said reflecting mirror on said mirror cell, wherein said three reflecting mirror support mechanisms are respectively provided with a supporting structure part supported at said mirror cell, a lever installed on said supporting structure part rotatably around a first axis extending parallel to the circumferential direction of the reflecting mirror, a rotating part installed on said lever rotatably around a second axis comprising an axis of said lever and third and fourth axes and a connecting part installed on said rotating part and supported on said reflecting mirror, a load detector driven by a parallel link mechanism installed between said reflecting mirror support mechanism and said mirror cell and by said parallel link mechanism, said three reflecting mirror support mechanisms being supported in such a manner that they will not be displaced in the first axis direction or second axis direction, said second axis extending perpendicular to the surface of the reflecting mirror, said first, third and fourth axes intersecting the second axis at right angles, said third axis and fourth axis crossing at right angles on the same plane, said first axis and fourth axis being configured so as to extend parallel to each other, an excessive load prevention mechanism being installed between said first axis and said supporting structure part, said excessive load prevention mechanism being provided with a hollow casing, a first needle contained in the casing in a vertically movable manner, a first spring for energizing said first needle toward the bottom part of said casing, a second needle supported on said first needle in a vertically movable manner and a second spring for energizing said second needle toward the upper part of said casing, said first axis of said reflecting mirror support mechanism being rotatably supported by said second needle.

\* \* \* \* \*